United States Patent

[11] 3,585,336

| [72] | Inventor | William P. Suckow |
| --- | --- | --- |
| | | Portland, Oreg. |
| [21] | Appl. No. | 806,438 |
| [22] | Filed | Mar. 12, 1969 |
| [45] | Patented | June 15, 1971 |
| [73] | Assignees | John E. Beall; |
| | | G. Franklin Beall |
| | | Portland, Oreg., part interest to each |

[54] SEAM WELDING BY HIGH FREQUENCY RESISTANCE HEATING
1 Claim, 6 Drawing Figs.

[52] U.S. Cl. .................................................. 219/59,
219/64
[51] Int. Cl. ...................................................... B23k 31/06
[50] Field of Search ............................................. 219/8.5, 59,
67, 104

[56] References Cited
UNITED STATES PATENTS
2,075,121  3/1937  Lessmann..................... 219/67X 2,687,464  8/1954  Crawford ..................... 219/8.5
2,919,343  12/1959  Rudd............................. 219/67X Primary Examiner—D. F. Duggan
Attorney—Buckhorn, Blore, Klarquist and Sparkman ABSTRACT: Apparatus for welding together the edges of a longitudinal gap in metal tubing by high frequency resistance heating including a pair of rollers mounted respectively to contact the tubing at opposite sides of the gap and at a position substantially at the welding point. Each of the rollers has an annular recess formed therein in such a manner that rotation of the rollers as the tubing is advanced causes a portion of the recesses to come into close predetermined spaced relationship to the respective edges of the gap. A magnetic but substantially insulating material having a low loss factor, high volume resistivity and magnetic permeability substantially greater than unity is disposed within the recesses such that the flow of current along the edges of the gap caused by the high frequency heating is concentrated along the edges of the gap.

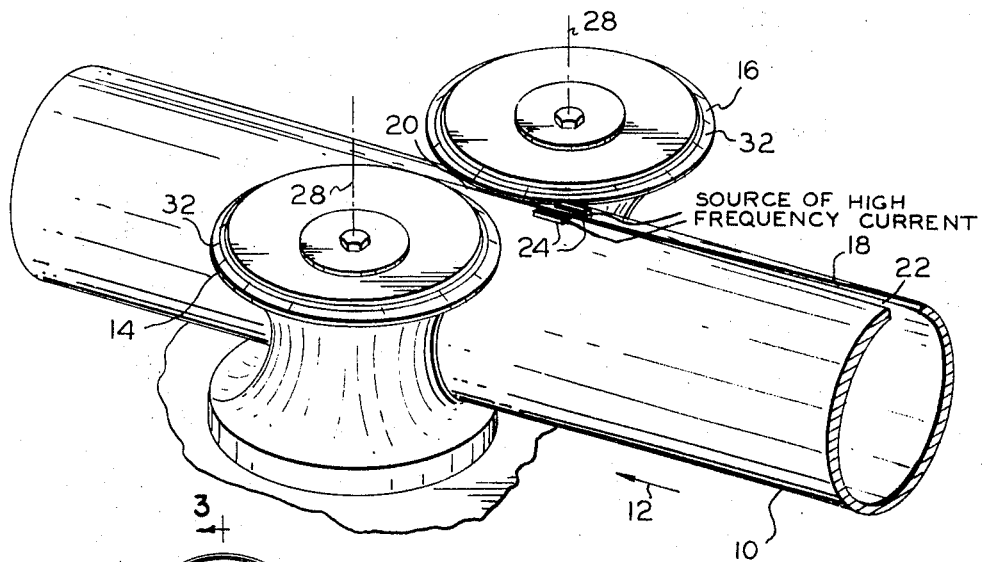
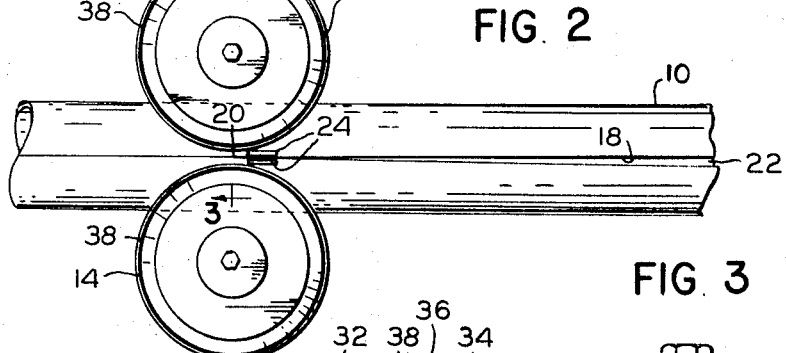
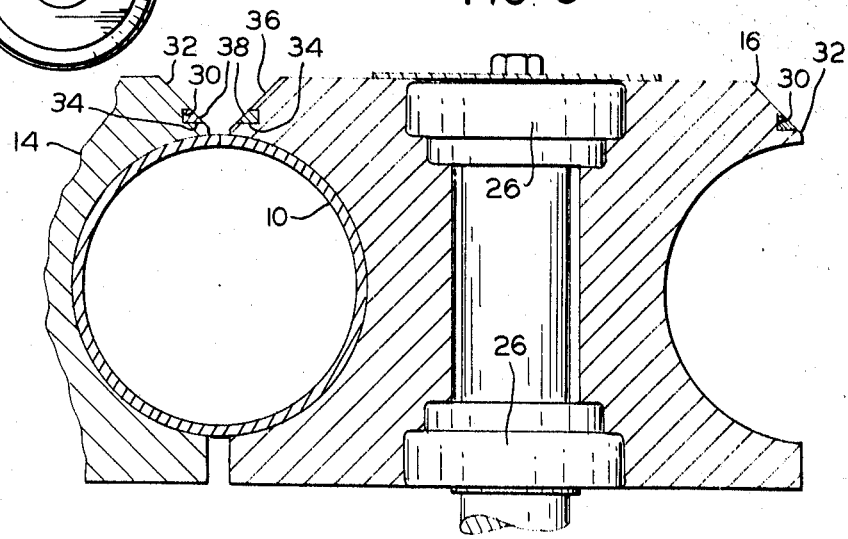

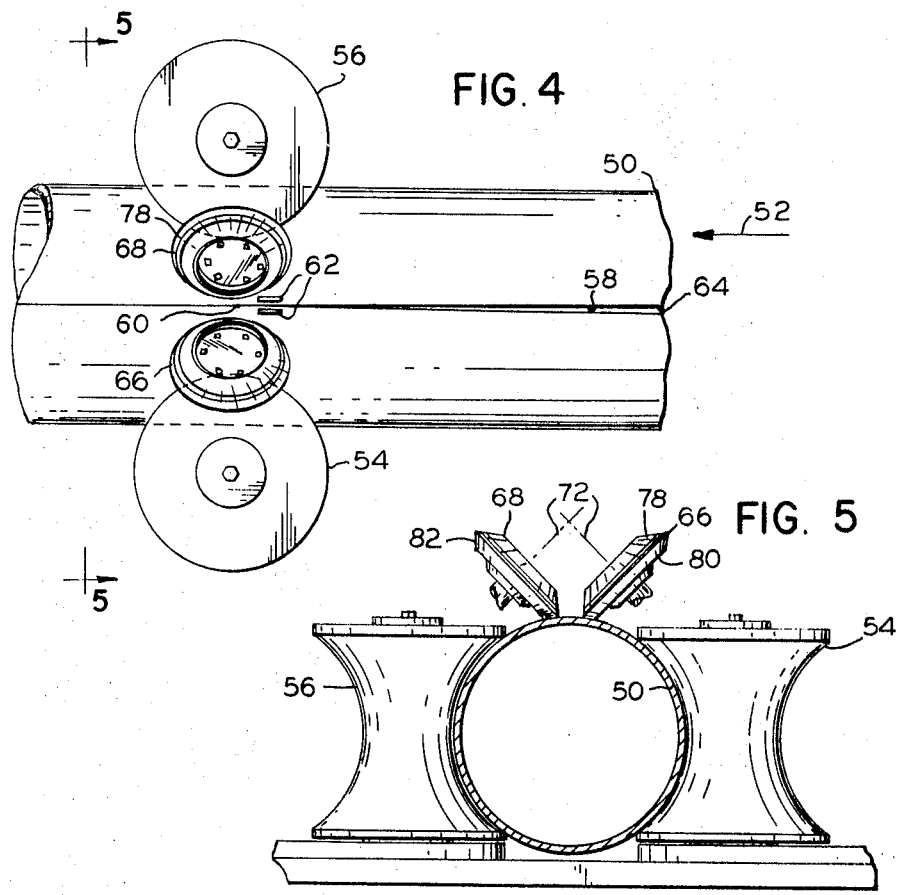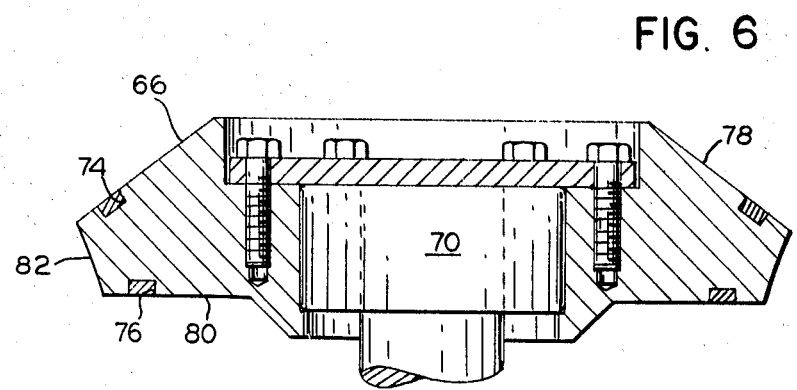

3,585,336

SEAM WELDING BY HIGH FREQUENCY RESISTANCE HEATING

BACKGROUND OF THE INVENTION

This invention relates to apparatus for the welding of longitudinal seams in metal tubing and, more particularly, to apparatus for the welding of such tubing using high frequency current.

High frequency current—that is, current of a frequency of the order of hundreds of thousands of cycles—is an efficient means of welding together the V-shaped gap formed by the two opposite edges of metal tubing after they have been brought together at a welding point. The current is supplied to a pair of contacts which engage the opposite sides of the tube metal just prior to the point where the gap closes. The resulting heating softens the edges so that they may be welded together by pressure applied thereto by means of rollers or other well-known devices.

In high frequency welding, it is desirable for the current to be concentrated such that it flows along the edges of the V-shaped gap, thereby to minimize the amount of current that will flow circumferentially around the tube. In the past this has been accomplished by mounting within the tubing underneath the gap or exteriorly of the tubing along the edges of the gap a magnetic but substantially insulating material. This material greatly increases the impedance of the current path circumferentially around the tubing from one contact to the other, thereby to cause the radio or high frequency current to be concentrated where it is desired along the V-shaped gap edges. Sintered ferric oxide has been used for this purpose, although other magnetic material having a permeability preferably substantially greater than one may be used.

SUMMARY OF THE INVENTION

In the present invention a strip of magnetic but substantially insulating material is disposed in an annular recess formed in each of a pair of rollers mounted on opposite sides of the V-shaped gap formed by the two opposite edges of the metal as they are brought together at the welding point. The rollers are positioned substantially at the welding point so that the strips of magnetic material are positioned in close predetermined relation to the respective edges of the gap. Presence of the magnetic material adjacent the edges of the gap concentrates the flow of current therealong as the tubing advances through the rollers and minimizes the flow of current circumferentially around the tube. Locating the magnetic material in the manner herein disclosed is a convenient and inexpensive disposition thereof and results in a more efficient use of power, thereby to make it possible substantially to increase the speed of welding.

BRIEF DESCRIPTION OF THE DRAWINGS

FIG. 1 is a perspective view of tube welding apparatus illustrating one embodiment of the present invention.

FIG. 2 is a plan view of the portion of the apparatus illustrated in FIG. 1.

FIG. 3 is a sectional view to an enlarged scale taken on line 3–3 of FIG. 2.

FIG. 4 is a plan view of another embodiment of the present invention.

FIG. 5 is a sectional view taken on line 5–5 of FIG. 4.

FIG. 6 is a sectional view to an enlarged scale taken through one of the rollers illustrated in FIGS. 4 and 5 and showing the location of the magnetic material therein.

DESCRIPTION OF THE PREFERRED EMBODIMENTS

Referring to the drawings and in particular to FIGS. 1—3, a length of metal tubing is indicated at 10 as it advances in the direction indicated by the arrow 12 through a conventional tube mill having squeeze rollers 14, 16 for pressing the edges 18 of the tube into contact at a weld point 20. Thus in practicing the invention in the manner shown in FIGS. 1–3, the tubing as it advances has previously been shaped by apparatus not shown into generally tubular form but still has a longitudinal gap 22 with edges 18 which must be seamed. The rollers 14 and 16 together with other rollers (not shown) serve to advance the tubing through the mill and also bring the edges 18 together at the weld point 20.

As is customary, a high frequency current source is connected to contacts 24 which are mounted so as to be engaged by the surfaces of the metal on opposite sides of the gap 22 and at a position slightly in advance of the welding point 20. The high frequencies contemplated for the present invention may be, for example, in the neighborhood of 100,000 cycles per second or up to 300,000 or 400,000 cycles or higher. The resultant heating softens the edges 18 so that they may be welded together at the point 20 by the pressure applied by the rollers 14, 16.

The rollers 14, 16 are journaled on bearings 26 (see FIG. 3) whose axes 28 are positioned substantially at, although preferable slightly behind, the welding point. For example, in an installation where the contacts 24 are positioned approximately seven-eighths inch in advance of the welding point 20, the axes 28 of the rollers 14, 16 may be positioned approximately one-eighth inch behind the welding point as shown in FIG. 2. In the embodiment illustrated in FIGS. 1–3 the axes 28 of the rollers 14, 16 are vertical and the pressure exerted by the rollers on the tubing is substantially horizontal to effect closure of the gap 22 at the welding point 20.

A feature of the invention resides in the fact that each of the rollers 14, 16 has an annular recess 30 cut in the flange 32 formed at its upper periphery. (See FIG. 3.) In the embodiment illustrated, the recess 30 is cut into the rollers 14, 16 with its sides 34 horizontal although in some installations it might be preferable to orient the cross section of the recess such that the walls 34 thereof are perpendicular to the edge 36.

A strip of magnetic material 38 is disposed within each of the recesses 30. Such material may, for example, be a nonconductive sintered magnetic oxide having a low loss factor and high volume resistivity. Such a material is marketed under the trademark "Ferramic" by General Ceramic & Steatite Corp. Preferably, pulverized material is cemented into the recesses with an epoxy cement to form a continuous strip thereof. Other types of magnetic material may be used providing they have a magnetic permeability greater than unity and preferably substantially greater than unity.

As illustrated in the drawings, rotation of the rollers 14, 16 causes the recesses 30 to come into a close predetermined spaced relation to the edges 18 of the metal as the edges approach the welding point 20. Maintaining magnetic material in this position greatly increases the impedance of the current path from one of the contacts 24 circumferentially around the tubing to the other contact. The resulting increase in impedance of this circumferential path causes the current to be concentrated where it is desired along the V-shaped edges of the gap 22. This results in a more efficient use of power and substantially increases the speed of welding.

In the embodiment illustrated in FIGS. 4—6, a length of metal tubing 50 advances in the direction of the arrow 52 through a tube mill having conventional pressure rollers 54, 56 for horizontally pressing the tube edges 58 which are to be welded together at a weld point 60. As in the previous embodiment, a radio frequency current source (not shown) is connected to contacts 62 mounted respectively to engage surfaces of the tube on opposite sides of the gap 64 and at a position slightly in advance of the weld point 60.

In this embodiment of the invention, V-rolls or pinch rolls 66, 68 are mounted on bearings 70 and are adapted to apply pressure downwardly upon the tubing immediately adjacent the edges of the gap 64. (See FIG. 5.) As in the previous embodiment, the axes 72 of the rolls 66, 68 lie in a plane positioned substantially at, although preferably slightly behind, the welding point 60.

Each of the rolls 66, 68 is provided with a pair of annular recesses 74, 76 therein in which is disposed the magnetic insulation material above described. The recess 74 is formed with its edges perpendicular to a face 78 of the roll, and the recess 76 is formed with its edges perpendicular to a face 80 of the roll. The faces 78 and 80 are on either side of the surface 82 which applies the normal pressure to the metal tubing. Positioning the magnetic insulation material in recesses as shown impedes the high frequency current flow away from the welding zone, thereby to concentrate the path of current flow along the edges of the gap 64.

I claim:

1. In high frequency welding apparatus for welding together the edges of a longitudinal gap in metal tubing and having means for longitudinally advancing the tubing while subjecting the same to pressure at opposite sides of said gap to bring such edges together at a welding point in a narrow V-shaped formation, a pair of contacts mounted respectively to be engaged by surfaces of the metal of the tubing adjacent opposite sides of the gap at a position slightly in advance of said welding point, a source of electrical current of a frequency of the order of 100,000 cycles per second or higher and terminals respectively connected to said contacts whereby said current will follow a path from one of said contacts along one edge of said gap to said welding point and back along the opposite edge of said gap to the other of said contacts, the improvement comprising:

a pair of pressure applying rollers mounted respectively to contact said tubing at opposite sides of said gap and at a position substantially at said welding point and adapted to bring said sides together at said welding point in said narrow V-shaped formation, each of said rollers having an annular recess formed therein, each of said recesses being spaced from the surfaces of said rollers in contact with said tubing, and a strip of magnetic but substantially insulating material having a low loss factor, high volume resistivity and magnetic permeability substantially greater than unity disposed within each of said recesses, whereby rotation of said rollers during the advancing of said tubing causes said magnetic material to be in close predetermined spaced relation to the respective edges of said gap but not in direct contact with said edges, thereby relatively to concentrate the flow of current in said path along said edges of said gap as said tubing advances through said rollers.